July 11, 1950            H. I. BECKER            2,514,924
PULSE ECHO DETECTION OF MOVING TARGETS
Filed March 27, 1946
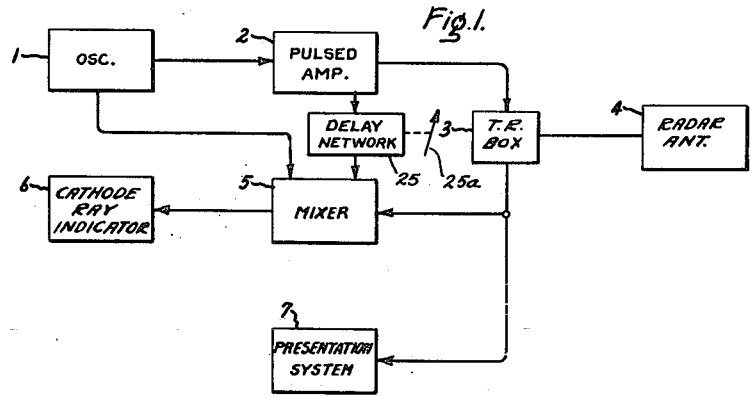
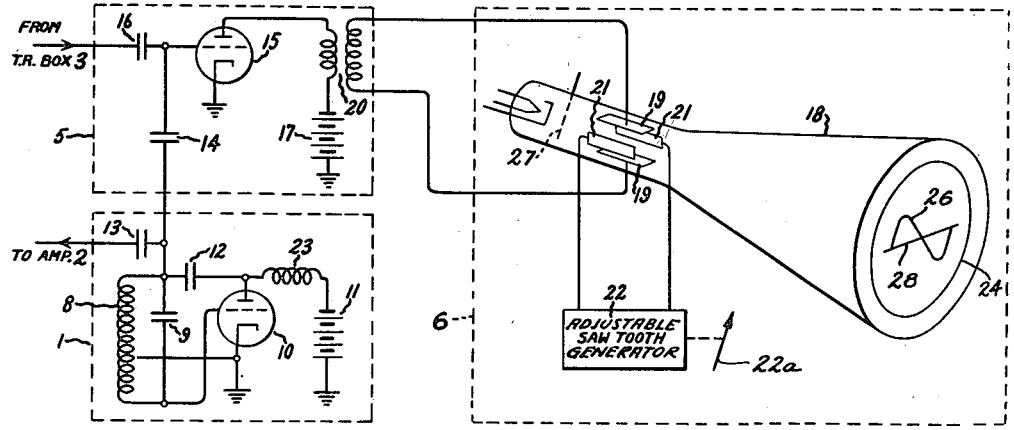
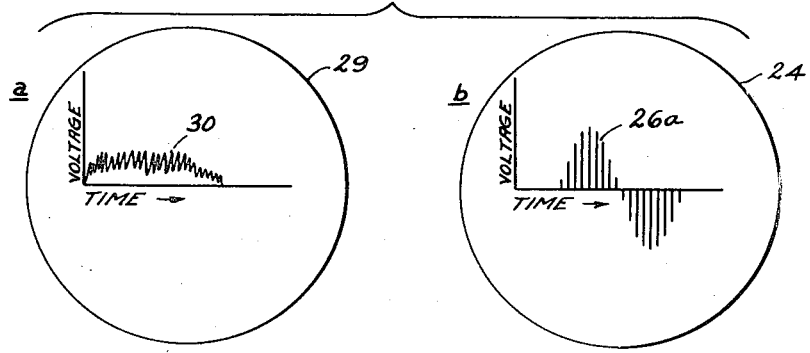
Inventor:
Howard I. Becker,
by Merton D. Morse
His Attorney.

Patented July 11, 1950

2,514,924

UNITED STATES PATENT OFFICE 2,514,924

PULSE ECHO DETECTION OF MOVING TARGETS

Howard I. Becker, Rexford, N. Y., assignor to General Electric Company, a corporation of New York Application March 27, 1946, Serial No. 657,407

4 Claims. (Cl. 343—9)

My invention relates to pulse echo systems and more particularly to means for determining the relative velocity of remote objects detected by such systems.

In one type of pulse echo system, recurrent energy pulses, such as high frequency radio waves, are generated and projected over an area. Return energy pulses due to reflections from remote objects or reply pulses from equipment on these objects are detected and the time interval between the transmitted pulses and the corresponding return pulses utilized to measure the distance between the pulse echo system and the remote objects.

It is an object of my invention to provide improved means whereby the velocity as well as the distance of remote objects may be determined by a pulse echo system.

It is a further object of my invention to provide means to measure the velocity of remote objects by a pulse echo system which may be utilized without disturbing the normal functions of the system in determining the position and distance of remote objects.

Still another object of my invention is to provide means of detecting the presence of remote moving objects located in positions where the normal operation of a pulse echo system is not effective.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which Fig. 1 is a block diagram showing the various components of my invention, Fig. 2 is a more detailed diagram showing one method of presenting information obtained with my system and Fig. 3 shows in further detail the image produced by a conventional object detecting system as compared with that produced by my system under the same conditions.

Fig. 1 shows an embodiment of my invention as applied to a radio type pulse echo system. Oscillator 1 produces continuous waves of high frequency radio energy and is constructed to have a high degree of frequency stability. Radio frequency amplifier 2 is supplied with oscillations from oscillator 1 so that the normal output voltage of this amplifier has frequency and phase corresponding to the output voltage of oscillator 1. In addition, means are provided on amplifier 2 to cause it to operate in successive short pulses, each pulse, however, being long compared to the period of oscillator 1. This may be accomplished by applying voltage impulses between suitable electrodes of this amplifier or by designing the amplifier to be inherently self-pulsing. Oscillations from amplifier 2 are supplied through equipment 3 to antenna 4. The purpose of equipment 3 is to protect the receiving system from the intense energy pulses transmitted by amplifier 2 and to reduce dissipation of the weaker received pulses in the transmitter circuits. This equipment may comprise any of the usual so-called transmit-receive devices, or TR boxes, commonly employed in radio pulse echo systems for this purpose.

Return pulses reflected from objects located in the field of antenna 4 or reply energy pulses from such objects are applied through equipment 3 to mixer 5. The purpose of the latter unit is to combine these signals with signals from oscillator 1 in a manner providing a heterodyne or beating effect, thereby producing an output signal having frequency proportional to the frequency difference between these two signals. This signal is applied to the deflecting system of cathode ray indicator 6 to provide visual indication of its characteristics.

In addition to the components described above, a conventional radar image presentation system may be utilized in connection with oscillator 1, amplifier 2, equipment 3, and antenna 4. In this system, shown in block form as unit 7, received signals from equipment 3 are detected to produce energy pulses. These are compared as to time of occurrence with the transmitted energy pulses to measure the time interval between the transmitted pulses and the return pulses and hence the range of the remote objects.

Fig. 2 shows in further detail circuits embodying one form of my invention. In this figure, oscillator 1 is shown as a conventional Hartley oscillator utilizing a resonant circuit composed of inductance 8 and capacitor 9 together with triode electron discharge device 10. Battery 11 provides anode voltage for device 10 through reactor 23 and capacitor 12 provides a low impedance path for radio frequency energy between the anode and the resonant circuit. Oscillations from oscillator 10 are applied through coupling capacitor 13 to amplifier 2 and through coupling capacitor 14 to the control electrode of electron discharge device 15 which operates as a mixer. Pulses from equipment 3 are also applied through coupling capacitor 16 to the control electrode of device 15 so that the total control electrode voltage at this device is equal to the sum of the output voltage of oscillator 1 and the voltage of return pulses passing through equipment 3. Anode voltage for device 15 is provided by source 17 which may produce a constant voltage or, in an embodiment to be described below, a series of voltage pulses.

In Fig. 2, the cathode ray indicator 6 comprises a cathode ray device 18 and associated control circuits, including a sawtooth sweep generator 22, to indicate the characteristics of the output voltage from device 15. This is accomplished by connecting vertical deflecting plates 19 to the secondary of transformer 20 and connecting horizontal deflecting plates 21 to the output of generator 22. Preferably, generator 22 produces a sawtooth voltage wave which successively deflects the ray across screen 24 in a single direction at constant velocity. The frequency of generator 22 may be adjusted by any suitable means, as indicated schematically by arrow 22a.

When no return pulses are applied to the control electrode of device 15, the only voltage appearing at this point is that of oscillator 1. This voltage is of very high frequency, as for example 300 megacycles, and by reason of the natural high attenuation in the circuits of device 15, transformer 20, and deflecting plates 19, does not produce any substantial voltage tending to deflect the cathode ray beam. When a return pulse from a moving object appears at the control electrode of device 15, a relatively low frequency voltage component is produced by beat action between this signal and signals from oscillator 1. This low frequency voltage is due to the variation in the number of cycles of radiated energy impinging on the remote object due to its motion toward or away from the pulse-echo equipment. This effect is commonly referred to as "Doppler" effect. Inasmuch as the frequency of this voltage depends on the relative motion of the remote object and the pulse-echo equipment, measurement of this frequency provides a method of determining this velocity. In general the velocity of remote objects relative to the equipment will be such that this frequency is less than one megacycle. This low frequency voltage appears at the primary of transformer 20 and deflects the cathode ray beam in device 18 by altering the relative potential between vertical deflecting plates 19. A sawtooth voltage is applied to horizontal deflecting plates 21 from source 22 simultaneously with the above described low frequency voltage applied to deflecting plates 19.

Considering now, for purposes of explanation, the performance of the system of Figs. 1 and 2 without the pulsing apparatus associated with amplifier 2. In this case, a continuous wave is transmitted having frequency determined by oscillator 1 and a corresponding continuous return wave is received, the received wave having frequency determined by oscillator 1 and the relative velocity of the remote object causing the return signal. A low frequency voltage is accordingly applied to the primary of transformer 20, thereby deflecting the cathode ray beam in device 18 in the vertical direction. This may be observed from the image 26 on screen 24 of device 18. In observing this vertical deflection, the operator may change the sawtooth frequency supply from source 22 to horizontal deflecting plates 21 until a single sine wave appears on the screen of device 18. He then is aware that one sawtooth sweep takes place for each cycle of voltage applied to vertical deflecting plates 19 and may determine the frequency of this voltage from the frequency of sawtooth source 22. Knowing this frequency, he may readily determine the relative velocity of the moving object.

Actually the radiated energy in antenna 4 consists of a series of successive pulses due to the pulsing apparatus associated with amplifier 2. If, for instance, the frequency of these pulses is many times the frequency of the beat note at the primary of transformer 20, that note will appear to be interrupted and instead of the single sine wave voltage shown on screen 24 in Fig. 2, a series of vertical bars, each representing a single pulse, will appear. An image 26a will then appear on screen 24 as shown in Fig. 3b. It will be understood, of course, that the appearance of the screen depends on the relative value of pulse repetition rate as determined by the pulsing apparatus associated with amplifier 2 and the frequency of the beat note at the primary of transformer 20. In addition, the inductance and capacitance in the circuits of device 15 and device 18 will tend to attenuate the very low frequency and very high frequency components of the output signal. This will tend to cause the bars of Fig. 3b to become less clearly defined but will not prevent observation of the general shape of the image nor a determination of the beat frequency by measuring the frequency of generator 22 required to produce a single wave on screen 24.

If, on the other hand, the length of a transmitted pulse is long compared to the frequency of the beat note at the primary of transformer 20, a complete sine wave such as that shown at 26 on screen 24 in Fig. 2 will result. In this case the only effect of the pulsing is to cause the sine wave to appear for short intervals of time separated by periods during which no image appears. In general the pulse frequency or repetition rate is so great that the eye cannot follow these image changes and the image appears without flicker. If, in addition, the intensity control electrode 27 of device 18 is supplied from a suitable source of blanking voltages (not shown) so as to prevent an indication except when signals are received in antenna 4, the zero deflection line 28 on screen 24 of device 18 (due to sweeping the ray during the interval between signals) will not appear and the only image will be that corresponding to the signal desired to be observed.

One of the advantages of my invention is that it permits operation of radar equipment under conditions wherein useful information is ordinarily impossible to obtain. If, for instance, the system is directed to an area containing a plurality of relatively large targets, reflections between these targets may so disturb the normal path of both transmitted and return energy pulses that the image presentation will be unintelligible. If, for example, the conventional presentation system 7 indicates the distance to remote objects by the horizontal position of a luminous point on an image screen 29 (Fig. 3a) and the intensity of the return signal as a vertical deflection, the image might appear substantially as shown at 30 in Fig. 3a in which individual target reflections are masked by "ground clutter" or "grass." This is because the reflections from the various objects are so broken up by reflections between them that a number of small signals each having a different apparent range appear. This image often cannot be utilized to detect any particular object.

In accordance with this invention it is possible to determine the presence of any moving object at an angle causing a large number of reflections. This is due to the fact that return signals from the stationary objects, together with return signals coming from complex paths between them, are of the same frequency as the master oscillator and therefore do not produce an image on screen 24 of device 18. On the other hand, a moving object produces a difference frequency due to Doppler effect which exists even if the energy eventually reaching antenna 4 is reflected from other objects. Thus, an image such as that shown in Fig. 2 or that shown in Fig. 3b is produced and is available to determine the presence of the moving object.

In accordance with a further aspect of my invention, confusion resulting from the presence of a plurality of moving remote objects may be eliminated by "gating" the mixer 5 so as to operate only on return signals having a predetermined time delay, or range interval. In one method of achieving this performance, a "gate" pulse is applied from amplifier 2 to mixer 5 in such manner as to cause mixer 5 to operate only when that pulse is applied. This pulse may, for example, be the anode voltage applied to device 15 through delay network 25, the latter network producing delay voltage pulses of value suitable for use as source 17, Fig. 2. The "gate" pulse is intentionally delayed from output pulses from amplifier 2 by a predetermined time which may be adjusted, as indicated schematically by arrow 25a, to correspond with the distance to the particular moving remote object desired to be observed. The image shown on device 18 will then correspond to pulses received from that object only and confusion will thereby be avoided.

It will further be understood that while I have described my invention as applied to a radio pulse echo system, it is not limited thereto but may be applied to pulse echo systems using sonic or other types of energy pulses as well, the basic principle being that of utilizing a single oscillator to supply energy pulses and beating reflected energy pulses with the signal from that oscillator.

While I have illustrated a particular embodiment of my invention, it will of course be understood that I do not wish to be limited thereto since various modifications both in the circuit arrangements and in the instrumentalities employed may be made, and I contemplate by the appended claims to cover any such modifications as fall within the true spirit and scope of my invention.

What I claim as new and desire to secure by Letters Patent of the United States is:

1. A velocity-measuring pulse echo system comprising means for generating continuous ultra-high frequency oscillations of constant frequency, pulse transmitting means controlled by said generated oscillations for radiating pulses of energy at said frequency toward a remote object, said pulses each having a duration long as compared to the period of said oscillations, pulse receiving means for receiving corresponding pulses of ultra-high frequency oscillations reflected from said object, means for combining said reflected oscillations with said generated oscillations, means responsive to any difference frequency between said combined oscillation for developing a pulse voltage at said difference frequency, a cathode ray device having a viewing screen, a sweep voltage generator operable over a range of low frequencies comparable to said difference frequency, means for deflecting said ray in one direction in response to said pulse voltage and in another direction in response to said sweep voltage, and means for independently adjusting the frequency of said sweep generator so that said ray traces a stationary pattern on said screen when the frequencies of said voltages have an integral ratio, whereby said relative velocity may be determined from said sweep frequency.

2. A velocity-measuring pulse echo system comprising a generator of continuous ultra-high frequency oscillations of constant frequency, a pulse transmitter synchronized from said generator and adapted to radiate pulses of energy at said frequency toward a remote object, said pulses each having a duration long as compared to the period of said oscillations, a pulse receiver adapted to be energized by corresponding pulses of ultra-high frequency oscillations reflected from said object, said receiver including a mixer for combining said reflected oscillations with oscillations from said generator, means responsive to any difference frequency between said combined oscillations, due to relative velocity of said remote object with respect to said system, for developing a pulse voltage at said difference frequency, a cathode ray device having a pair of coordinate ray deflecting elements and a viewing screen, means for impressing said pulse voltage on one of said elements, a sweep generator operable over a range of relatively low frequencies comparable to said difference frequency, means for impressing the output of said sweep generator on the other of said elements, and frequency control means for independently adjusting the frequency of said sweep generator to cause said ray to trace a predetermined stationary pattern on said screen, whereby said relative velocity may be determined from said sweep frequency.

3. A velocity-measuring pulse echo system comprising a generator of continuous ultra-high frequency oscillations of constant frequency, a pulse transmitter controlled by said generator for radiating pulses of energy at said frequency toward remote reflecting objects, said pulses each having a duration long as compared to the period of said oscillations, a pulse receiver for receiving corresponding pulses of ultra-high frequency oscillations from said remote objects after time intervals determined by their ranges, a mixer for combining said reflected oscillations from said generator, adjustable range gating means controlled by said transmitter for rendering said mixer operative only during a selected range interval, means responsive to any difference frequency between combined oscillations occurring during said interval due to a reflecting object within said interval for developing a pulse voltage at said difference frequency, a cathode ray device having a viewing screen, a sweep voltage generator operable over a range of low frequencies comparable to said difference frequency, means for deflecting said ray in one direction in response to said pulse voltage and in another direction in response to said sweep voltage, and means for independently adjusting the frequency of said sweep generator so that said ray traces a stationary pattern on said screen when the frequencies of said voltages have an integral ratio, whereby said relative velocity may be determined from said sweep frequency.

4. Apparatus for measuring relative velocity between a pulse echo system and a remote reflecting object comprising a source of oscillations of a predetermined, constant, ultra-high frequency, means for transmitting discontinuous pulses of said oscillations toward said object from said system means for receiving echoes of said pulses at said system, means for mixing said echoes with oscillations from said source and developing a pulse voltage proportional to their difference frequency, a cathode ray device having a pair of coordinate ray deflecting elements and a viewing screen, a sweep wave generator adjustable over a range of low frequencies comparable to said difference frequency, means for energizing said pair of elements from said pulse voltage and said generator respectively, and means for independently adjusting said sweep frequency, whereby said ray traces a stationary pattern from which said velocity may be determined when said difference frequency and sweep frequency have an integral relationship.

HOWARD I. BECKER.

REFERENCES CITED

The following references are of record in the file of this patent:

UNITED STATES PATENTS

| Number | Name | Date |
| --- | --- | --- |
| 2,406,316 | Blumlein | Aug. 27, 1946 |
| 2,408,742 | Eaton | Oct. 8, 1946 |
| 2,412,631 | Rice | Dec. 17, 1946 |
| 2,423,023 | Hershberger | June 24, 1947 |
| 2,444,388 | De Vries | June 29, 1948 |